United States Patent [19]

Kubick

[11] Patent Number: 4,576,441

[45] Date of Patent: Mar. 18, 1986

[54] VARIABLE FRESNEL LENS DEVICE

[75] Inventor: Frederick Kubick, White Plains, N.Y.

[73] Assignee: United Technologies Corporation, Hartford, Conn.

[21] Appl. No.: 585,815

[22] Filed: Mar. 2, 1984

[51] Int. Cl.$^4$ ........................ G02B 3/08; G02B 27/44; G02F 1/05

[52] U.S. Cl. .................................... 350/355; 350/379; 350/380; 350/452; 350/162.16; 350/389

[58] Field of Search ...................... 350/162.16, 162.21, 350/162.22, 162.2, 162.17, 355, 356, 374, 379, 380, 384, 389, 390, 392, 400, 401, 402, 406, 452, 411

[56] References Cited

U.S. PATENT DOCUMENTS

| | | | |
|---|---|---|---|
| 2,591,701 | 4/1952 | Jaffe | 88/61 |
| 2,600,962 | 6/1952 | Billings | 88/65 |
| 2,939,142 | 5/1960 | Fernsler | 343/754 |
| 3,257,608 | 6/1966 | Bell et al. | 325/0.5 |
| 3,334,958 | 8/1967 | Appeldorn | 350/211 |
| 3,369,242 | 2/1968 | Johnson | 343/754 |
| 3,393,034 | 7/1968 | Imai | 350/260 |
| 3,445,851 | 5/1969 | Sheldon | 343/754 |
| 3,499,701 | 3/1970 | Macek et al. | 350/389 |
| 3,503,670 | 3/1970 | Kosanke et al. | 350/150 |
| 3,507,550 | 4/1970 | Harris et al. | 350/150 |
| 3,513,323 | 5/1970 | Sincerbox et al. | 250/225 |
| 3,522,985 | 8/1970 | Rogers | 350/157 |
| 3,528,728 | 9/1970 | Rogers | 350/157 |
| 3,555,987 | 1/1971 | Browning | 95/53 |
| 3,558,215 | 1/1971 | DeLang et al. | 350/150 |
| 3,574,441 | 4/1971 | Harris et al. | 350/150 |
| 3,575,487 | 4/1971 | Ohm et al. | 350/150 |
| 3,575,488 | 4/1971 | Ohm et al. | 350/150 |
| 3,623,795 | 11/1971 | Taylor et al. | 350/150 |
| 3,631,501 | 12/1971 | Buscher et al. | 343/754 |
| 3,744,875 | 7/1973 | Haertling et al. | 350/150 |
| 3,781,086 | 12/1973 | Kumada et al. | 350/150 |
| 3,809,461 | 5/1974 | Baumgardner et al. | 350/302 |
| 3,868,172 | 2/1975 | Ii et al. | 350/150 |
| 3,938,878 | 2/1976 | Fox | 350/150 |
| 4,129,357 | 12/1978 | Frosch et al. | 350/157 |
| 4,154,505 | 5/1979 | Kato et al. | 350/150 |
| 4,197,008 | 4/1980 | Pinnow et al. | 356/150 |
| 4,201,450 | 5/1980 | Trapani | 350/150 |
| 4,222,638 | 9/1980 | Robert | 350/96.14 |
| 4,229,073 | 10/1980 | Lotspeich | 350/150 |
| 4,327,971 | 5/1982 | Kondo et al. | 350/388 |
| 4,340,283 | 7/1982 | Cohen | 350/162.16 |

OTHER PUBLICATIONS

M. B. Klein, *Dielectric Waveguide Modulators at 95 GHz Using LiNb01(*)*, International Journal of Infrared and Millimeter Waves, vol. 3, No. 5, (1982).

M. B. Klein, *Phase Shifting at 94 GHz Using the Electro-Optic Effect in Bulk Crystals,* International Journal of Infrared and Millimeter Waves, vol. 2, No. 2, (1981).

Cecil E. Land and Philip D. Thacher, *Ferroelectric Ceramic Electrooptic Materials and Devices,* Proceedings of the IEEE, vol. 57, No. 5, May 1969.

*Primary Examiner*—John K. Corbin
*Assistant Examiner*—Bruce S. Shapiro
*Attorney, Agent, or Firm*—Robert P. Sabath

[57] ABSTRACT

A ferroelectric focussing and defocussing device for operation at millimeter wavelengths applicable for use as a component in radar systems. Electrodes direct fields reversibly and continuously modify the refractive character of the ferroelectric material of the device as incoming radiation seeks to proceed along the optic axis of the material. The device includes first and second material media sharing complementary sides with Fresnel contours.

10 Claims, 3 Drawing Figures

VARIABLE FRESNEL LENS DEVICE

The Government has rights in this invention, pursuant to Contract No. DAAK21-80-C-0089 awarded by the Department of the Army.

TECHNICAL FIELD

This invention relates to millimeter (MM) wavelength devices employing anisotropic, nonlinear dielectric materials which exhibit electro-optic variability, and more particularly to the design and fabrication of microwave and radar components operable at millimeter wavelengths, in particular frequencies in the range of 95 Gigahertz (GHz).

BACKGROUND ART

Ferroelectric materials have become well known since the discovery of Rochelle salt for their properties of spontaneous polarization and hysteresis. See the *International Dictionary of Physics and Electronics,* D. Van Nostrand Company Inc., Princeton (1956) at pg. 331. Other ferroelectrics including barium titanate have also become familiar subjects of research.

However, the application of the properties of ferroelectric materials to millimeter wavelength devices and radar systems is largely uncharted scientific terrain.

At MM wavelengths, standard microwave practice is hampered by the small dimensions of the working components, such as waveguides and resonant structures. Furthermore, there is a considerable lack of suitable materials from which to make the components. Even beyond this, the manufacturing precision demanded by the small dimensions of the components, makes their construction difficult and expensive. Ferrite phase shifters used at other frequencies are unsuitable, and alternative materials are generally not available.

Ferroelectric materials are accordingly of particular interest, because certain of their dielectric properties change under the influence of an electric field. In particular, an "electro-optic" effect can be produced by the application of a suitable electric field.

As is well known, ferroelectric materials are substances having a non-zero electric dipole moment in the absence of an applied electric field. They are frequently regarded as spontaneously polarized materials for this reason. Many of their properties are analogous to those of ferromagnetic materials, although the molecular mechanism involved has been shown to be different. Nonetheless, the division of the spontaneous polarization into distinct domains is an example of a property exhibited by both ferromagnetic and ferroelectric materials.

A ferroelectric medium has the property that its propagation constants can be changed by applying a sufficiently intense electric field along a suitable direction. This phenomenon is known as the electro-optic effect. Ferroelectric media are unique since they are capable of linear electro-optic activity in contrast to more familiar media wherein the electro-optic activity is typically quadratic. This linear activity, defined as a linear dependence of the refractive index on the applied electric field, is a consequence of the domain structure of the ferroelectric material.

Accordingly, it is an object of this invention to establish a device for continuously focussing and defocussing a millimeter radiation passing through a ferroelectric medium by electrical means.

It is an object of this invention to develop a millimeter wavelength focussing and defocussing device for use in radar signal control operation, amplitude modification and beamsplitting.

It is an object of the invention to develop a ferroelectric millimeter wavelength device for microwave radar application at the millimeter wavelength range, which is reversibly and continuously controllable over a range of focal distances.

It is a further object of the instant invention to produce a millimeter wavelength ferroelectric focusser and defocusser effective for processing microwave signals in a radar system.

DISCLOSURE OF INVENTION

The instant invention calls for the disposition of a ferroelectric Fresnel lens and its complementary compensating counterpart lens in the path of millimeter wavelength radiation to establish a continuously controllable focussing and defocussing device for radar application. The ferroelectric material for the deivce has at least a single optical axis which is disposed along the direction of propagation of the radiation. The orientation of the ferroelectric domains in the Fresnel lens are opposed to the domains in the complementary lens. The application of a suitably dimensioned electric field occurs by means of transparent electrodes straddling the medium. By straddling, it is meant that one electrode is on one side of the medium; another, on the opposite side thereof.

Variable focussing and defocussing is established by the degree of electric field strength applied through the electrodes straddling the lens. This changes the angle of refraction of the radiation as it enters and leaves the lens and its complement.

BRIEF DESCRIPTION OF DRAWING

The invention will be better understood from the following description taken in conjunction with the accompanying drawing, wherein.

BEST MODE FOR CARRYING OUT THE INVENTION

Figure 1:
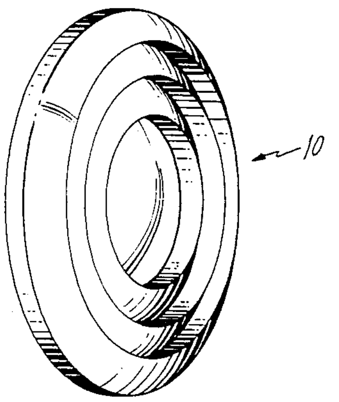
FIG. 1 shows the structure of a Fresnel lens with a top section cut away to illustrate the ridges on its surface.
Figure 2:
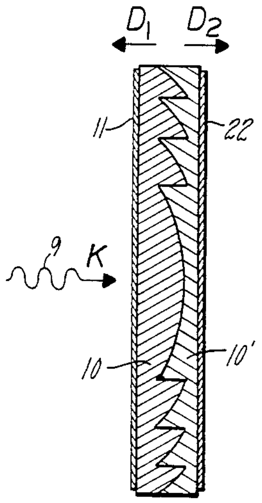
FIG. 2 shows the lens in cross-section with a compensating lens nested thereagainst with opposing domains, and with a beam of millimeter wavelength radiation extending along its axis and through a transparent electrode pair straddling the lens combination.

The focussing and defocussing device shown in FIGS. 1 and 2 is made of ferroelectric material subject to incident radiation 9 directed along its axis. The direction of propagation of the incident radiation is indicated by arrow "K".

The radiation is characterized, for example, by a frequency of 95 GHz, which corresponds to a millimeter wavelength of 3.16. The focussing and defocussing device is in the shape of a Fresnel lens 10 and its complement 10', as indicated in FIGS. 1 and 2.

The device is subject to a pair of electrodes, respectively 11 and 22, for applying an electric field along the wave direction of propagation. Each member of the electrode pair is suitably disposed near an opposite side of the lens pair in alignment with their coincident optic axes. Electrode pair 11 and 22 is transparent to the passage of radiation.

In FIG. 2, electrode pair 11 and 22 is provided with a suitably strong voltage from voltage source and controller 12 in alignment with the respective optic axes 31, 32 of the lens pair. A suitable field strength is in the order of typically 10 kV/cm.

Figure 3:
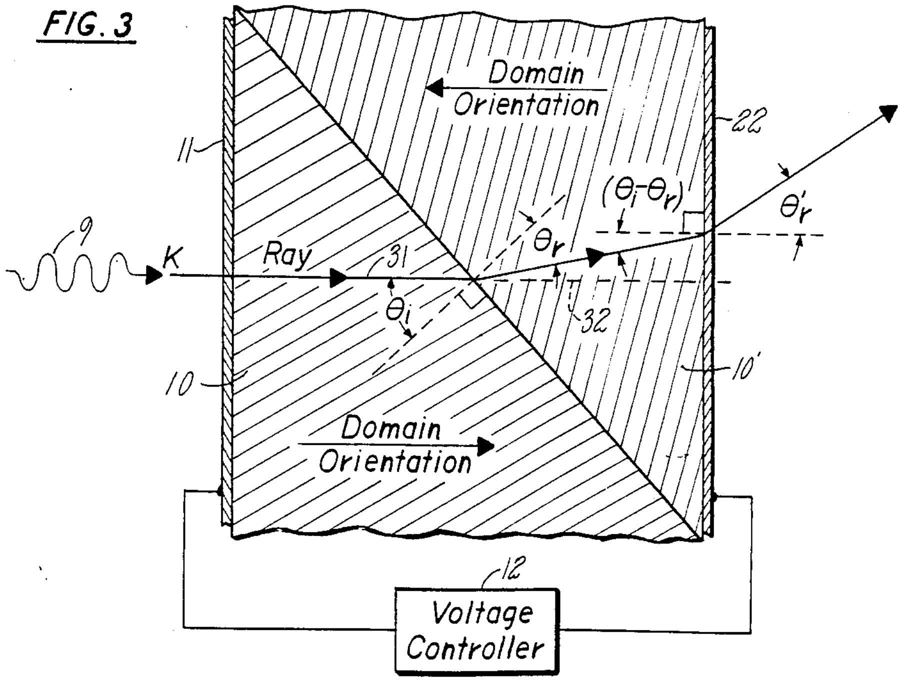
FIG. 3 shows a small portion of the lens to illustrate the refraction at boundary surfaces.

FIG. 3 displays the nature of beam refraction for a single Fresnel boundary. Two refractions actually occur: one at the Fresnel boundary interface between the two lens components which results from the opposing domains, and one at the exit surface. At the Fresnel boundary, the angle of deviation of a particular ray (theta(i) minus theta(r) i.e. $O_i-O_r$) is typically less than ten degrees. Theta(r) is the deviation from the perpendicular of a plane tangent to the complementary surfaces between the lens 10 and its complement 10', as suggested in detail in FIG. 3. At the exit surface, the ray is deviated still further by an amount depending on how much the index of the lens exceeds that of its surroundings. Typically, the total ray deviation can be as large as 30 degrees for applied electric fields of a few kV/cm. Since the angle that the internally refracted ray makes with the optic axis is not large, the medium remains essentially isotropic to the radiation.

Ferroelectric materials can be produced as polycrystaline mixtures, which are especially useful. Further, random mixtures in an inert isotropic medium are of interest to component developers. Polycrystaline mixtures are preferred because of the difficulty of growing single large crystals. For example, a low-index of refraction isotropic medium may be doped with oriented single-domain crystals of a given ferroelectric in appropirate concentrations, endowing the medium with considerable electro-optic properties of the desired kind. Dielectric mixtures or structured composites could be employed for the ferroelectric material.

The order to focus and/or defocus the incoming beam of radiation, the voltage level across the Fresnel lens 10 and its complement 10' is adjusted as desired.

After reference to the foregoing, modifications may occur to those skilled in the art. However, it is not intended that the invention be limited to the specific embodiment shown. The invention is broader in scope and includes all changes and modification falling within the parameters of the claims below.

I claim:

1. A device for focussing and defocussing a beam of radiation in the range of millimeter wavelength radiation, comprising:

first and second material media having adjoining complementary sides with Fresnel lens contours, each having a flat outer side as well, said media being birefringent and having coincident optic axes with opposing domain orientations, said axes being disposed in the direction of propagation of said beam of millimeter wavelength radiation;

a pair of electrodes adjoining said material media, said electrodes being orthogonal to said optic axes; and electric means for providing a voltage between said pair of electrodes to establish a continuously changeable and reversible electric field across said media for controllably directing the focussing and defocussing activity of the device.

2. The device of claim 1, wherein said pair of electrodes is in the path of said beam of millimeter wavelength radiation.

3. The device of claim 1, wherein said pair of electrodes is transparent to said beam of millimeter wavelength radiation.

4. The device of claim 1, wherein said material medium is ferroelectric.

5. The device of claim 1, wherein said material medium includes barium titanate.

6. A method of focussing and defocusing a beam of radiation in the range of millimeter wavelength radiation, comprising the steps of:

directing a beam of radiation having millimeter wavelength characteristics at a combined material media having parallel input and output walls, and sharing complementary sides having Fresnel lens contours, said media being birefringent and having coincident optic axes with opposing domain orientations, said axes being disposed in the direction of propagation of said beam of millimeter wavelength radiation;

disposing a pair of electrodes adjoining said material media, each of said electrodes being orthogonal to said coincident optic axes; and applying a continuously changeable and reverisble voltage between said pair of electrodes.

7. The method of claim 6, wherein said pair of electrodes is in the path of said beam of millimeter wavelength radiation.

8. The method of claim 6, wherein said pair of electrodes is transparent to said beam of millimeter wavelength radiation.

9. The method of claim 6, wherein said material medium is ferrelectric.

10. The method of claim 6, wherein said material medium includes barium titanate.

* * * * *